United States Patent [19]

Rauckhorst

[11] Patent Number: 5,248,116
[45] Date of Patent: Sep. 28, 1993

[54] AIRFOIL WITH INTEGRAL DE-ICER USING OVERLAPPED TUBES

[75] Inventor: Richard L. Rauckhorst, North Canton, Ohio

[73] Assignee: The B. F. Goodrich Company, Akron, Ohio

[21] Appl. No.: 832,472

[22] Filed: Feb. 7, 1992

[51] Int. Cl.$^5$ ............................................. B64D 15/16
[52] U.S. Cl. ................................................. 244/134 A
[58] Field of Search ........................ 244/134 R, 134 A

[56] References Cited

U.S. PATENT DOCUMENTS

| | | | |
|---|---|---|---|
| 2,327,034 | 8/1943 | Geer | 244/134 A |
| 2,394,063 | 2/1946 | Hunter | 244/134 |
| 2,418,205 | 4/1947 | Taylor | 244/134 |
| 2,418,262 | 4/1947 | Hunter | 244/134 |
| 2,420,137 | 5/1947 | Hunter | 244/134 |
| 2,421,621 | 6/1947 | Hunter et al. | 244/134 |
| 2,422,624 | 6/1947 | Hunter | 244/134 |
| 2,937,826 | 5/1960 | Johnson | 244/134 A |
| 2,957,662 | 10/1960 | Hess | 244/134 |
| 3,370,814 | 2/1968 | Kageorge et al. | 244/134 |
| 3,690,601 | 9/1972 | Roemke | 244/134 |
| 4,004,388 | 1/1977 | Stefanik | 52/398 |
| 4,099,691 | 7/1978 | Swanson et al. | 244/207 |
| 4,516,745 | 5/1985 | Ely et al. | 244/134 |
| 4,561,613 | 12/1985 | Weisend, Jr. | 244/134 |
| 4,690,353 | 9/1987 | Haslim et al. | 244/134 |
| 4,706,911 | 11/1987 | Briscoe et al. | 244/134 |
| 4,747,575 | 5/1988 | Putt et al. | 244/134 R |
| 4,836,474 | 6/1989 | Briscoe et al. | 244/134 |

OTHER PUBLICATIONS

A Study of Wins De-Icer Performance on Mount Washington Copyright 1948 by the Institute of the Aeronautical Sciences vol. 7, No. 9.

Primary Examiner—Galen Barefoot
Attorney, Agent, or Firm—David M. Ronyak; Leonard L. Lewis

[57] ABSTRACT

A structural member having integral surface de-icing capability and method of manufacture are described. The structural member includes a non-metallic high tensile modulus fiber-reinforced matrix structural backing, thin force and displacement generation means, and a thin high tensile modulus outer skin bonded to said backing and said force and displacement generation means which is positioned between the backing and the skin. The force and displacement generation means may include one or more inflatable tubular members preferably formed into a tube mat having bonded overlapped portions so as to distribute displacement forces. This reduces concentrated stress and fatigue while increasing surface shear forces across the ice accreting surface with each tube actuation. The structural member may be substituted for the aluminum alloy leading edge structural skin typically employed on modern aircraft.

21 Claims, 7 Drawing Sheets

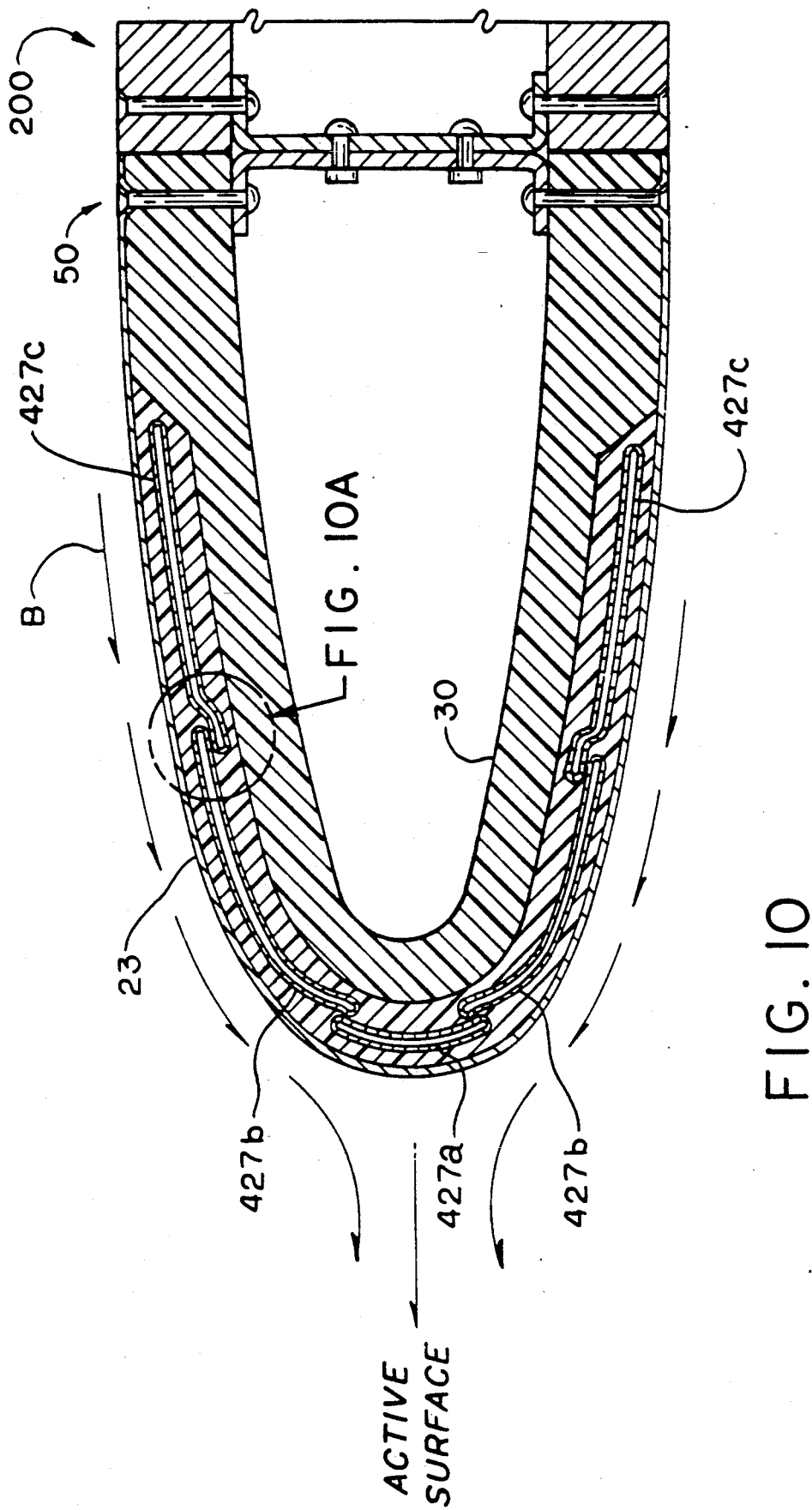

AIRFOIL WITH INTEGRAL DE-ICER USING OVERLAPPED TUBES

FIELD OF THE INVENTION

This invention relates to a composite structural member including as an integrated feature a system for separating a solid body such as a layer of ice from the outer surface of the structural member. More particularly, this invention relates to a structural member particularly suitable as an airfoil or leading edge which includes as an integral feature, a force and displacement generation means suitable for de-icing of the outer high modulus skin of the composite structural member when employed in aircraft leading edge surfaces. This invention further relates to an improved force and displacement generation means that can be used integrally with such a structural member, or can be attached to an airfoil or leading edge as part of a separate de-icer assembly. This application is a continuation-in-part of my copending application for Structural Airfoil Having Integral Expulsive System, U.S. patent application Ser. No. 7/432,715, filed on Nov. 6, 1989, now U.S. Pat. No. 5,098,037.

BACKGROUND OF THE INVENTION

From the beginning of powered aviation, aircraft have been under certain flying conditions troubled by accumulations of ice on component surfaces of aircraft such as wings and struts. If unchecked, such accumulations can eventually so laden the aircraft with additional weight and so alter the airfoil configuration of the wings and control surfaces of that aircraft so as to precipitate an unflyable condition. Efforts to prevent and/or remove such accumulations of ice under flying conditions has resulted in three generally universal approaches to removal of accumulated ice, a process known generally as de-icing.

In one form of de-icing, known as thermal de-icing, leading edges are heated to loosen adhesive forces between accumulating ice and the aircraft component. "Leading edges" as used herein means those edges of an aircraft component on which ice accretes and are impinged upon by air flowing over the aircraft and having a point or line at which this airflow stagnates. Once loosened, this ice is generally blown from he aircraft component by the airstream passing over the aircraft.

There are two popular methods of heating leading edges. In one approach known as electrothermal de-icing, an electrical heating element is placed in the leading edge zone of the aircraft component, either by inclusion in a elastomeric boot applied over the leading edge, or by incorporation into the skin structure of the aircraft component. This heating element is typically powered by electrical energy derived from a generating source driven by one or more of the aircraft engines and is switched on and off to provide heat sufficient to loosen accumulating ice. In small aircraft, a sufficient quantity of electrical power may be unavailable for use of electrothermal de-icing.

In the other heating approach, gases at elevated temperature from one or more compression stages of a turbine engine are circulated through the leading edges of components such as wings and struts in order to cause a de-icing or anti-icing effect. This approach is employed typically only in aircraft powered by turbine engines by draining off compressed air having an elevated temperature from one or more compressor stations of a turbine engine. This approach can result in reduced fuel economy and lower turbine power output.

The second commonly employed method for de-icing involves chemicals. In limited situations, a chemical has been applied to all or part of an aircraft to depress adhesion forces associated with ice accumulation upon the aircraft or to depress the freezing point of water collecting upon surfaces of the aircraft.

The remaining commonly employed method for de-icing is typically termed mechanical de-icing. In the principal commercial mechanical de-icing means, pneumatic de-icing, the leading edge zone or wing or strut component of an aircraft is covered with a plurality of expandable, generally tube-like structures that are inflatable employing a pressurized fluid, typically air. Upon inflation, the tubular structures tend to expand substantially the leading edge profile of the wing or strut and crack ice accumulating thereon for dispersal into the airstream passing over the aircraft component. Typically, these tube-like structures have been configured to extend substantially parallel to the leading edge of the aircraft. These conventional low pressure pneumatic de-icers are formed from compounds having rubbery or substantially elastic properties. Typically, the material forming the inflatable tubes on such de-icer structures can expand or stretch by 40% or more during an inflatable cycle, thereby causing a substantial change in the profile the de-icer as well as in the leading edge to thereby crack ice accumulating on the leading edge.

These conventional pneumatic de-icers require a large volume of air to inflate their highly expandable tubes and the time for inflating such tubes typically and historically has averaged from about two and six seconds. The distortion of the airfoil profile caused by inflation of the tubes can substantially alter the airflow pattern over the airfoil and adversely affect the lift characteristics of the airfoil. The rubber or rubber-like materials forming these conventional pneumatic de-icers typically are possessed of a Young's modulus (modulus of elasticity) of approximately 6900 kPa. The modulus of elasticity of ice is variously reported as being between about 275,000 kPa and about 3,450,000 kPa. Ice is known to be possessed of an elastic modulus enabling typical ice accumulations to adjust to minor changes in contours of surfaces supporting such ice accumulations. The modulus of elasticity of rubber compounds used in conventional de-icers is much lower than the modulus of elasticity typically associated with ice accumulations. The large expansion of conventional pneumatic de-icers has functioned to crack or rupture the structure of the ice accumulations thereby allowing such accumulations to be swept away by impinging windstreams.

Other mechanical means for effecting de-icing include electromechanical hammering such as that described in U.S. Pat. No. 3,549,964 to Levin et al. Concern respecting the susceptibility of the airfoil skin to stress fatigue upon being hammered over extended periods of time have functioned in part to preclude substantial commercial development or adoption of such technique.

Another electromechanical ice removal system is described in U.S. Pat. No. 4,690,353 to Haslim et al. One or more overlapped flexible ribbon conductors, each of which is folded back on itself, is embedded in an elastomeric material. When a large current pulse is fed to the conductor, the anti-parallel currents in the opposed segments of adjacent layers of the conductor result in interacting magnetic fields producing an electrorepulsive force between the overlying conductor segments causing them to be separated near instantaneously. This distention tends to remove any solid body on the surface of the elastomeric material.

Another electromechanical ice removal system is described in U.S. Pat. No. 4,875,644 to Adams et. al., the teachings of which are herein incorporated by reference. Two or more sheet-like arrays, each containing in spaced apart relationship a plurality of parallel ribbon-shaped electrical conductive members, are rapidly and forcefully driven apart when a large magnitude current pulse is fed to the conductors.

U.S. Pat. Nos. 4,706,911 to Briscoe et al. and 4,747,575 to Putt et al. disclose apparatus for de-icing leading edges in which an impulse of fluid under pressure is utilized to rapidly inflate an inflation tube positioned between a support surface and a sheet-like skin possessed of a substantially elevated modulus. The impulse of fluid is delivered to the inflation tube causing the high modulus skin to dislocate and then stop suddenly. Momentum imparted to the ice accumulations thereby causes additional ice movement which assists in ice detachment and dislodgement. The inflatable tubular structure in certain preferred embodiments is inflated within not more than about 0.1 second and preferably not more than about 0.5 milliseconds. FIG. 4 and the attendant description of U.S. Pat. No. 4,706,911 describe an ejector/pilot operated discharge valve suitable for use in such pneumatic impulse de-icers. In FIG. 7 and the attendant description of U.S. Pat. No. 4,747,575 there is described a chattering valve for use in a pneumatic impulse de-icer which delivers a rapid series of fluid pressure pulses to the inflatable tube of a de-icer apparatus affixed to a leading edge. Efforts to improve such pneumatic impulse de-icing systems have led to continuing efforts to improve valves for delivery of the desired fluid impulse.

While the devices and methods disclosed in the foregoing patents have been found to be suitable for de-icing of aircraft, it remains a desired goal of the industry to reduce weight and increase service life and reliability wherever possible. Toward these objectives modern aircraft designers and manufacturers are specifying with increasing frequency use of lightweight composite materials manufactured from high modulus fibers including, but not limited to, carbon, graphite, aramid, and glass in matrices of organic resins or carbon. Leading edge surfaces such as those found on wings and struts of aircraft and tail sections have been provided with separately manufactured apparatus such as that disclosed in U.S. Pat. Nos. 4,706,911 and 4,747,575. Such apparatus have been fitted to existing wing structures by adhesive bonding of such auxiliary de-icing apparatus. Such auxiliary devices change the contour of the leading edge by virtue of their presence, an undesired consequence. As an alternative, at the time of design or prior to fitting of such an s apparatus, the leading edge of the airfoil of certain prior art embodiments has been modified so as to provide a recess for fitment of the de-icing apparatus. This latter manner of providing de-icing apparatus resulted in a finished assembly having smooth airflow characteristics due to the provision of such recess. However, in this instance, the underlying support surface and airfoil has been structurally complete without addition of the de-icing apparatus. The de-icing apparatus provided no additional or minimal additional structural reinforcement to the underlying support surface to which it was affixed. Many of the heretofore known accessory de-icing apparatuses were provided with an outer ice accreting surface formed of elastomeric material such as rubber (neoprene) or urethane. These materials are far more susceptible to erosion from the action of rain, sleet, hail, and snow during flight than the conventional aluminum alloy leading edge surface employed on modern large commercial and certain general aviation and commuter aircraft. Such aircraft have a service life expectancy of twenty or more years, including the aluminum alloy skin which is typically from about 0.025 inch to about 0.190 inch thick. It is an objective of the aircraft industry to minimize repair or replacement of such de-icing apparatus. Ideally, it is desired that the de-icing apparatus include an ice accreting surface having a resistance to rain erosion at least equal to that of the aluminum alloy skin currently employed on large turbine powered commercial aircraft which are de-iced using bleed air systems.

Rain is not the only type of impact that leading edges encounter. Impacts by birds, hail, and debris kicked up from the runway and accidents during routine aircraft maintenance are also likely during the operational life of the aircraft.

In addition to the various improvements needed for airfoil and de-icing mechanisms, known pneumatic de-icers can also exhibit high stress points and bending moments typically near the anchor points of the inflatable tubes. Adjacent anchor points result in a "dead space" or inactive area where, despite actuation or inflation of either tube, no displacement occurs resulting in a high stress concentration. These inactive areas of high stress can cause fatigue in the outer skin particularly for high tensile modulus outer skins made of metal.

SUMMARY OF THE INVENTION

According to an aspect of the present invention, there is provided a structural member having integral surface de-icing capability which in one embodiment includes:
- (a) a non-metallic high tensile modulus fiber reinforced matrix structural composite substructure;
- (b) thin force and displacement generation means;
- (c) a thin high tensile modulus outer skin bonded to said substructure and said force and displacement generation means, said force and displacement generation means being positioned between said substructure and said skin and including an overlapped tube design.

According to another aspect of the invention, there is provided a method of making a structural member having integral surface de-icing capability, the method including:
- (a) providing a female mold,
- (b) inserting an outer metallic skin and an outer bonding layer into the mold,
- (c) forming and applying thin force and displacement generation means in the form of a tube mat to the outer bonding layer,
- (d) applying an inner bonding layer to the force and displacement generation means,
- (e) forming a composite substructure of a plurality of layers of reinforcing filaments in a polymeric matrix and applying said substructure to the inner bonding layer,
- (f) curing and bonding the combined outer skin, force and displacement generation means, and substructure at elevated temperature and pressure to provide said unitary structural member.

According to another aspect of the invention, a pneumatic de-icer is provided that incorporates an overlap tube design which operates to distribute the ice displacement forces thereby reducing stress concentrations and fatigue in the outer skin, while at the same time increasing the tangential or chord-wise strain in the ice accreting surface. An improved de-icer according to this aspect of the invention is suitable for use with an integral leading edge/de-icer structural member as described herein, as well as with conventional pneumatic de-icer apparatus such as the type that can be separately assembled and then attached to an airfoil or leading edge.

The features and advantages of the present invention will become more apparent when viewed in light of the description of the best embodiment to the invention and drawings which follow, which together form a part of the specification.

BRIEF DESCRIPTION OF THE DRAWINGS

FIG. 10 is a fragmentary sectional view of an airfoil similar to FIG. 1, having an alternative embodiment of a de-icer apparatus depicted in the un-energized state.

DETAILED DESCRIPTION OF THE INVENTION

The present invention provides an apparatus in the form of a structural member having integral surface separation capability which is capable of de-icing a leading edge. The present invention also provides a method of manufacture of such apparatus and a method for de-icing employing such apparatus. The present invention also provides an improved de-icing displacement mechanism and method of making the same. This improved de-icing mechanism reduces stress fatigue in the ice accreting surface while at the same time improving the removal of ice from the surface by increasing surface shear forces over a larger area of the leading edge. De-icing is removal of ice subsequent to its formation upon a leading edge. A "leading edge" is that portion of a surface of a structure which functions to meet and break an airstream impinging upon the surface of the structure. Examples of leading edges are respective forward portions of wings, stabilizers, struts, nacelles, and other housings and protrusions first impacted by an airstream passing over an aircraft while in flight.

Figure 1:
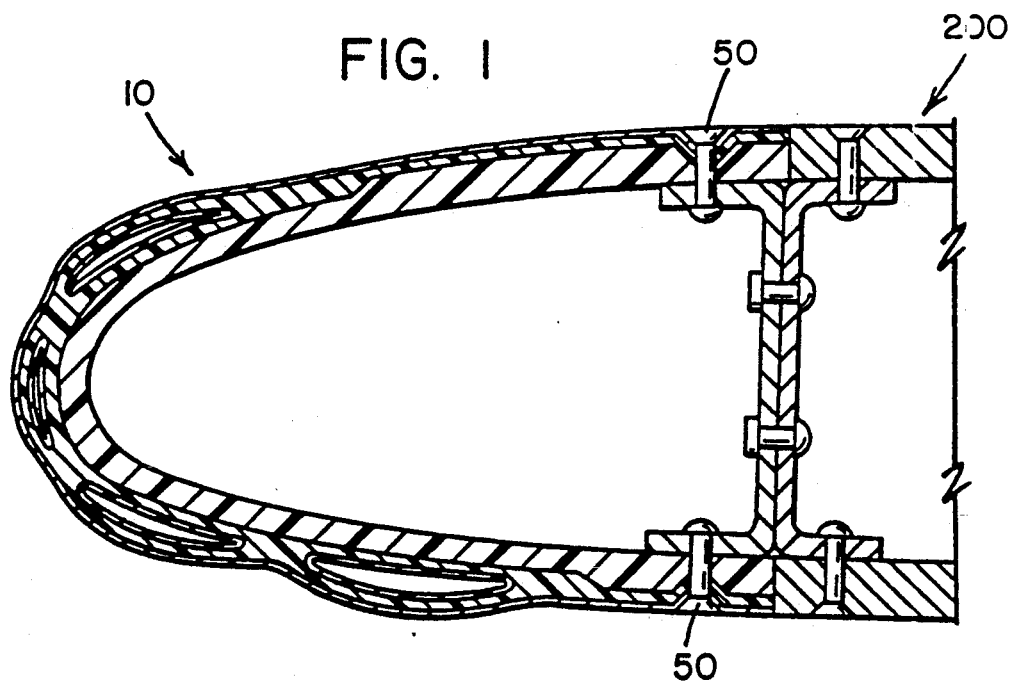
FIG. 1 is a fragmentary sectional view of an airfoil having an apparatus according to the present invention defining the leading edge portion thereof, depicted in the energized state.

Referring to the drawings, FIG. 1 depicts a leading edge structure 10 in accordance with the invention having integral de-icing capability. Apparatus 10 is shown in its energized condition with distortion exaggerated for purpose of illustration. In reality, the amount of distortion from the smooth continuous contour of the airfoil is much less. Apparatus 10 is employed in substitution for the heavy aluminum alloy skin (not illustrated) traditionally employed as the leading edge surface of an airfoil. Such aluminum alloy skins typically range in thickness from as low as about 0.025 inches to as high as 0.190 inches, the latter being for a 100-passenger or more capacity commercial airliner. Apparatus 10 is secured in position to the remainder of the airfoil structure 200 in conventional manner, i.e., by flush fitting mechanical fasteners 50 as shown in FIG. 1 or by adhesive bonding. Such construction enables field replacement of the apparatus 10 as required, for example, due to impact damage.

Figure 2:
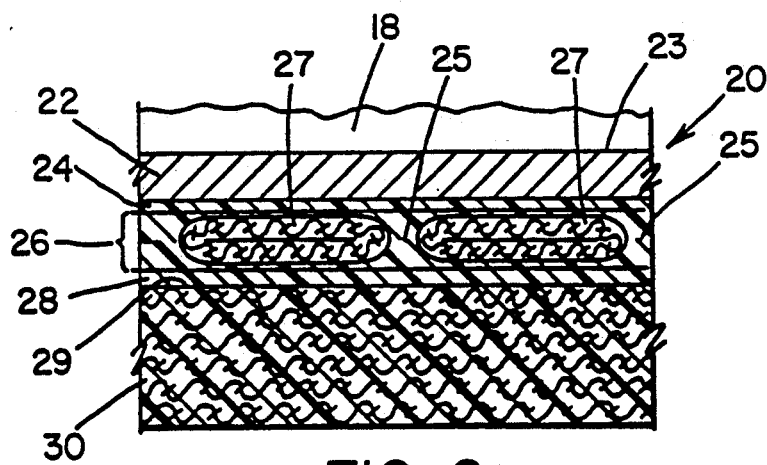
FIG. 2 is an enlarged fragmentary sectional view of an apparatus similar to that shown in FIG. 1 in its unenergized state with a layer of ice thereon.

Referring now to FIG. 2, there is shown a de-icing apparatus 20 according to a preferred embodiment of the present invention. Apparatus 20 includes a surface ply or outer skin 22 of a material having a modulus of elasticity of at least 40,000 kPa. Immediately underlying the surface or outer skin 22 is an outer or skin bonding ply 24 of polymeric material. Immediately underlying the skin bonding ply 24 is an expulsive force and displacement generation means 26. Immediately underlying the expulsive force and displacement generation means 26 is an inner bonding ply 28 of polymeric material. Underlying the inner bonding ply 28 is a fiber reinforced composite substructure 30. A layer of ice 18 is shown adhered to the outer surface 23 of outer skin 22.

The outer skin 22 may be formed from metal or plastic. Particularly preferred is an outer skin 22 formed of titanium alloy. Thickness of the outer skin 22 typically will range for metals from about 0.002 to about 0.030 inch and for plastics will range from about 0.005 to about 0.080 inch. Other suitable metals may include stainless steels and aluminum alloys. Particularly preferred plastic material for the skin is polyetheretherketone available from Imperial Chemical Industries PLC. Where longest service life is required, metals are strongly preferred.

Bonding plies 24 and 28 are formed of polymeric material suitable for bonding to the layers on either side. Such compounds are well known in the art and the selection of a particular compound will be predicated upon a number of factors which include operating environment, the nature of the outer ice accreting skin 22 and the underlying force and displacement generation means 26 for the outer bonding ply 24, and for the inner bonding ply 28 the materials used in the force and displacement generation means 26 and the adjacent contiguous layer 29 of the underlying composite substructure 30. Where the outer skin 22 is formed of titanium alloy and the force and displacement generation means 26 comprises inflatable tubular members 27, the outer bonding ply 24 is preferably formed of nitrile phenolic resin in the form of a film such as film adhesive AF32 available from 3M Company. The inner bonding ply 28 in certain preferred embodiments is also formed from such 10 mil thick nitrile phenolic film adhesive. The regions 25 between adjacent tubes 27 are also formed of the same nitrile phenolic materials. The same 3M product AF32 may be employed for both the outer bonding ply 24 and the inner bonding ply 28 provided it is compatible with the materials of the layers which it is to join. An eminently suitable alternate material for the inner and outer bonding plies 24, 28 and regions 25 is a flexibilized epoxy film such as code EA951 available from Hysol Aerospace Products, Pittsburg, Calif.

Layers 24 and 28 and the material in regions 25 are shown to be distinct to facilitate illustration and explanation of the invention. In practice distinct layers are commonly not recognizable and the material in regions 25 may have come from coating of tube materials or layers 24, 28.

Force and displacement generation means 26 is thin and typically has a thickness not exceeding 0.100 inch. Each inflatable member 27 is a tube-like structure typically running the length of the de-icer, i.e., in the spanwise direction of the apparatus and airfoil. Each inflatable member 27 is formed from polymer coated textile fabric. The fabric may be coated on one side only and formed into a tubular member with the coating facing to the outside of the tube or with the coating facing to the inside of the tube provided an adhesion barrier is placed in the inside of the tube during manufacture to prevent adhesive joining of the fabric layers, thereby preventing formation of an inflatable tubular member. Polytetrafluoroethylene (PTFE) film is well suited for use as an adhesive barrier in this application. Each inflatable tubular member 27 serves as a fluid impulse tube. The inflatable tubular members Within the apparatus are joined by conduit means (not illustrated) to the remainder of a de-icing system (not illustrated) which includes a timer/controller (not illustrated), a high pressure gas supply (not illustrated), and an impulse delivery valve (not illustrated).

A schematic of a suitable control system and high pressure valve for causing fluid impulse inflation of an inflatable tubular member in a structural member according to the invention having integral surface separation capability are described in U.S. Pat. No. 4,706,911, the contents of which are herein incorporated by reference. Preferred embodiments of gas impulse delivery valves are described in U.S. Pat. No. 4,873,647 to Robert M. Hohenshil and James C. Putt, the contents of which are herein incorporated by reference.

Figure 8:
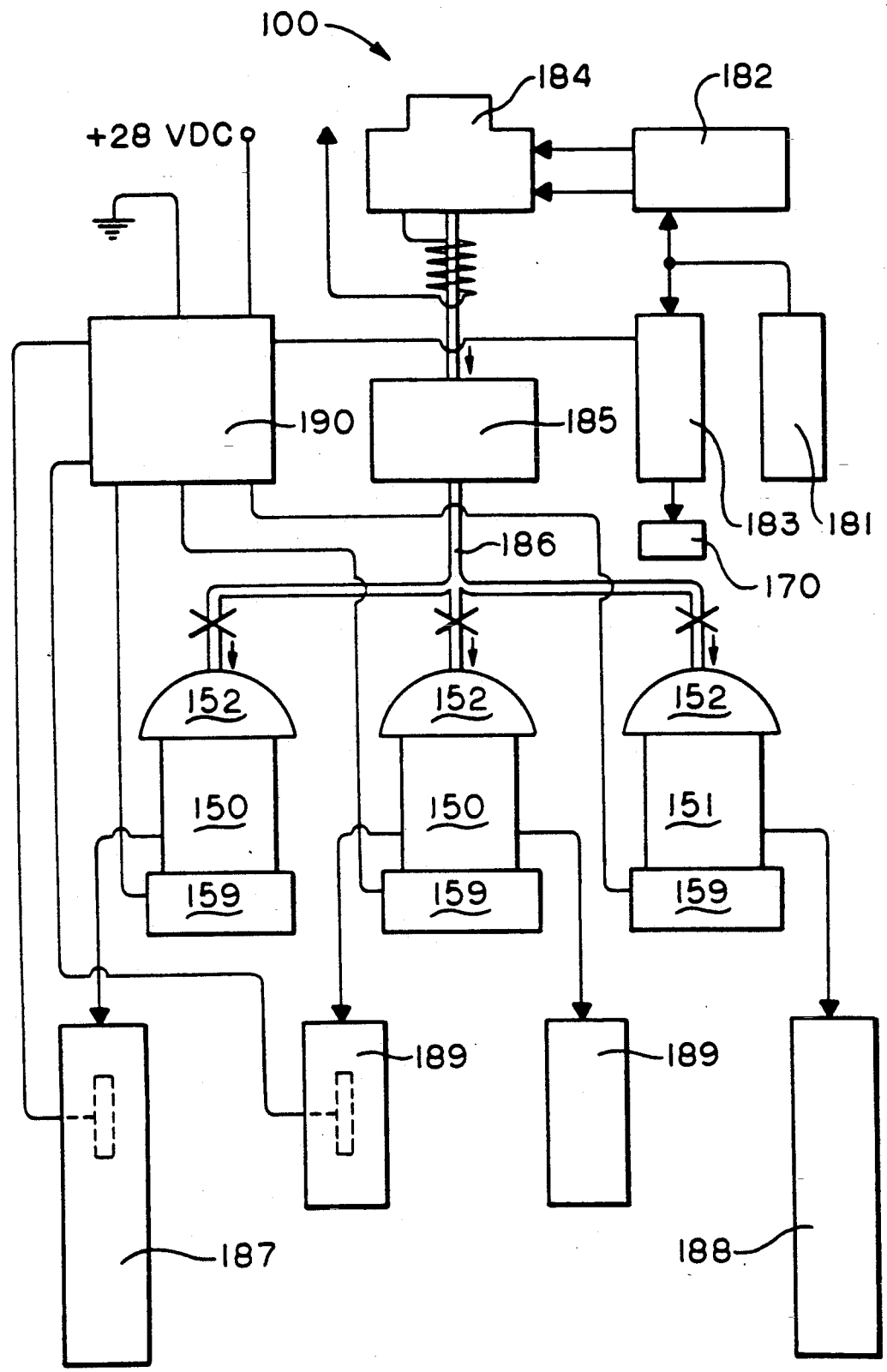
FIG. 8 is a schematic of a system for controlling activation of a structural member having integral surface separation capability according to the invention.

In FIG. 8 there is shown a suitable control system 100 and means for causing fluid impulse inflation of an inflatable tubular member in a structural member according to the invention. System 100 includes a source 181 of low pressure air such as a compressor or bleed from a jet engine turbine stage. The source 181 is joined to regulators 182, 183 for assuring a constant supply pressure of the low pressure air source. The regulator 183 is configured to supply low pressure air to the ejector 170 which may be associated with each pilot operated valve 150, 151. By applying a source of gas under relatively low pressure to the ejector during those time periods when the pilot valve 150, 151 main valve seats are closed, a vacuum may be drawn on the exit port of the pilot operated valve and thereby on the tubular inflatable members such as inflatable members 27 shown in FIG. 2 of the mat 400 shown in FIG. 10. The regulator 182 supplies a constant source of low pressure air to an intensifier 184 which boosts the pressure of the air arising from the low pressure source 181 to a desirably elevated pressure. An accumulator 185 is provided to receive the high pressure air. This accumulator 185 can be formed from suitable or conventional metal construction. High pressure air in the main accumulator 185 is available through suitable conduits 186 to accumulators associated with respective pilot valves 150, 151. The high pressure air from the accumulator 152 of each pilot operated valve 150, 151 is made available to the respective individual de-icing device 187, 188, 189 having inflatable tubular members 27 (or alternatively the tubes 427 in the mat 400, FIG. 10). A control device 190 functions to control the activation of the solenoids 159 associated with pilot operated valves 150, 151 whereby timed release of high pressure air to the inflatable members 27 of the de-icers 187, 188, 189 can be accomplished. The control device 190 can also determine the timing and magnitude of the supply of air from the vacuum regulator 183 to ejectors if provided which are associated with pilot operated valves 150, 151. Such control can be accomplished in well-known fashion. The low pressure source of air may be replaced by a high pressure source of air such as a compressor or a storage gas bottle (not shown) where upon the intensifier may become superfluous. The vacuum regulator 183 and regulator 182 may consist of a single unit supplying low pressure air for vacuum production and for intensification.

One of valves 151 shown on the right-hand edge of FIG. 8 may be a chattering valve for use in a pulse pneumatic de-icer such as that valve described in detail in U.S. Pat. No. 4,747,575. In certain preferred embodiments, a pulse of fluid partially inflates the inflatable tubular members such as members 27 causing the high modulus skin to dislocate and then to stop suddenly. Additional further inflation in staged pulses thereafter occurs thereby pulsatingly inflating the inflatable tubular member.

The fiber-reinforced polymer composite substructure 30 is formed of a plurality of layers of filamentary material in a matrix of thermoset polymeric material. Such materials and their combination into a laminated composite structure are well-known in the art. Selection of particular materials and a particular construction will be predicated upon a number of factors which may include the nature of the airfoil of which the apparatus is to form a leading edge component, bending stiffness, torsional stiffness, resistance to frontal impact, overall thickness limitation and overall weight limitation. Particularly preferred embodiments of apparatus according to the invention include a substructure 30 formed graphite or carbon fibers reinforcing an epoxy matrix. Other high modulus, high strength fibers, such as aramid and fiberglass and the like may be employed alone or in combinations including these and other fiber types.

Figure 3:
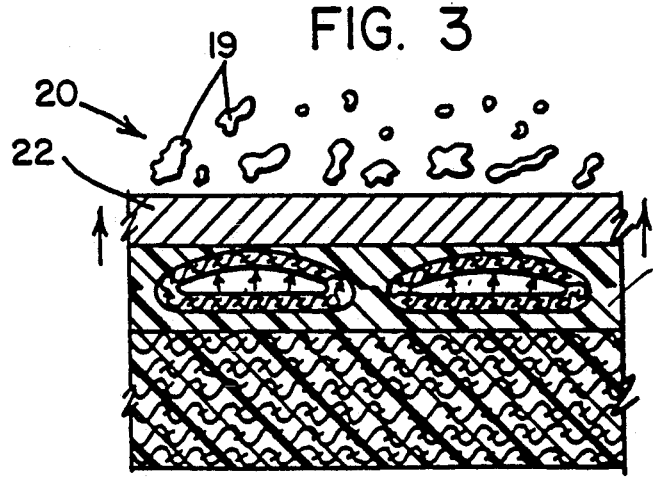
FIG. 3 is an enlarged fragmentary view of the apparatus of FIG. 2 in its energized state.

In FIG. 3 de-icing apparatus 20 is shown in its energized condition with ice particles 19 being ejected. De-icing apparatus 20 depicted in FIG. 3 is of the same construction as shown and described in regard to FIG. 2. FIG. 2 depicts de-icing apparatus 20 in its at-rest or unenergized condition with a layer of ice 18 thereon. In operation, high pressure gas, typically air, is introduced in the form of a pulse into inflatable tubular members 27. Such fluid introduction produces a rapid but momentary distortion in the outer skin 22 as the pulse travels along the tube. Operation of the apparatus 20 of the present invention is generally as described in U.S. Pat.

Nos. 4,706,911 and 4,747,575, and if additional inflatable tubes (not illustrated in the present application) which branch off the principal inflation tubes are provided, as described in U.S. Pat. No. 4,826,108. These gas pulses produce near instantaneous pressure changes within the inflatable tubular members 27 thereby producing a series of near instantaneous distortions to the ice accreting surface 23 overlying the de-icer tube 27 which cause ice layer 18 to be broken into particles 19 and ejected. Typical supply air pressure to a rapid acting valve whose output is introduced into inflatable tubular members 27 is at least about 1000 psig (6894 kpa), more preferably 1500 psig (10340 kPa), and may be in excess of 2000 psig (13788 kPa).

Applicants have unexpectedly discovered that unitary integrated de-icing apparatus including use of a composite substructure in a metal skinned, pneumatically-activated de-icer provides greatly improved performance as compared to earlier known constructions which are intended to be affixed by bonding or mechanical means to the outer surface of the original skin of an aircraft or other object to be de-iced. Heretofore the de-icing apparatus was separately manufactured in the form of a pad or boot adapted to be secured to the original structural skin of the airfoil. Such a device has been referred to as a de-icing pad or de-icing boot. In contrast, in the present invention the apparatus is intended to be substituted for the combined original structural skin and separately manufactured and attached auxiliary de-icing apparatus. Applicants have discovered that superior resistance to rain erosion requirements of the aircraft industry is exhibited by the invention. In contrast, apparatus according to the prior art exhibits much lower resistance to rain erosion testing with failure typically being exhibited as rupture of the outer ice accreting metal skin. The performance advantages of the invention are illustrated by the following examples.

EXAMPLE 1

Sample 1 was constructed as follows:

| | |
|---|---|
| ---------- | (0.005 Thick Ti alloy Surface) |
| ++++++++++ | (Natural Rubber Adhesive) |
| xxxxxxxxxx | (Natural Rubber) |
| ######### | (Inflatable Tube Force Generator) |
| xxxxxxxxxx | (Natural Rubber) |
| ////////////////// | (Contact Adhesive) |
| ●●●●●●●●●●●●●●●●●●●●●● | |
| ●●●●●●●●●●●●●●●●●●●●●● } | (Aluminum Substructure) |
| ●●●●●●●●●●●●●●●●●●●●●● | |

Rain Erosion Results - 1 Hour 30 Minutes.

The construction of Sample 1 is representative of results obtained from combining existing low pressure pneumatic de-icer technology and high pressure pneumatic impulse technology. The best rain erosion performance observed with this construction was 1 hour 30 minutes at which failure of the titanium alloy surface was observed.

EXAMPLE 2

Sample 2 was constructed as follows:

| | |
|---|---|
| ---------- | (.005 Thick Ti alloy) Surface |
| ++++++++++ | (Nitrile Phenolic Primer) |
| xxxxxxxxxx | (Nitrile Phenolic Film Adhesive) |
| ######### | (Inflatable Tube Force Generator) |
| xxxxxxxxxx | (Nitrile Phenolic Film Adhesive) |
| ========== | (Contact Adhesive) |
| ●●●●●●●●●●●●●●●●●●●●●● | |
| ●●●●●●●●●●●●●●●●●●●●●● } | (Aluminum Substructure) |
| ●●●●●●●●●●●●●●●●●●●●●● | |

Rain Erosion Results - 2 hours.

Nitrile phenolic primer and nitrile phenolic film adhesive were substituted for the natural rubber matrix utilized in Sample 1 to join the force and displacement generation means to the titanium alloy skin ply. As with Sample 1, contact adhesive was utilized to attach the ice protector to the aluminum substructure. Best observed performance on rain erosion was 2 hours with a small crack being first observed at 1½ hours. By the time 2 hours of testing had accumulated, the crack had propagated resulting in failure of the part.

EXAMPLE 3

Sample 3 was constructed as follows:

| | |
|---|---|
| ---------- | (.005 Thick Ti alloy) Surface |
| ++++++++++ | (Nitrile Phenolic Primer) |
| xxxxxxxxxx | (Nitrile Phenolic Film Adhesive) |
| ######### | (Inflatable Tube Force Generator) |
| xxxxxxxxxx | (Nitrile Phenolic Film Adhesive) |
| ========== | (Air Curing Adhesive) |
| ●●●●●●●●●●●●●●●●●●●●●● | |
| ●●●●●●●●●●●●●●●●●●●●●● } | (Aluminum Substructure) |
| ●●●●●●●●●●●●●●●●●●●●●● | |

Rain Erosion Results - 2 hours 45 minutes.

Sample 3 was identical in on construction to that of Sample 2, except that the contact adhesive utilized in Sample 2 was replaced with a room temperature air curing adhesive for bonding to the aluminum substructure. When subjected to rain erosion testing, cracks began to appear at the edges of the sample at 2 hours 30 minutes and considerable inside cracking and inside erosion were observed by 3½ hours. The part was deemed unserviceable upon accumulation of about 2 hours 45 minutes testing.

EXAMPLE 4

Sample 4 was of the following construction:

| | |
|---|---|
| ---------- | (.005 Thick Ti alloy) Surface |
| ++++++++++ | (Air Curing Primer) |
| ))))))))))))))))))))))))) | (Air Curing Adhesive) |
| xxxxxxxxxx | (Nitrile Phenolic Film Adhesive) |
| ######### | (Inflatable Tube Force Generator) |
| xxxxxxxxxx | (Nitrile Phenolic Film Adhesive) |
| ========== | (Air Curing Adhesive) |
| ●●●●●●●●●●●●●●●●●●●●●● | |
| ●●●●●●●●●●●●●●●●●●●●●● } | (Aluminum Substructure) |
| ●●●●●●●●●●●●●●●●●●●●●● | |

Rain Erosion Results - 30 Minutes.

The titanium surface and aluminum substructure were bonded to their respective contiguous layers with a room temperature air curing adhesive. After only 30 minutes of rain erosion testing, skin failure (fatigue cracking and chunking) was observed.

EXAMPLE 5

Sample 5 was of the following construction:

| | |
|---|---|
| ---------- | (.005 Thick Ti alloy) Surface |

-continued

| | |
|---|---|
| + + + + + + + + + + | (Urethane Adhesive) |
| × × × × × × × × × × | (.015 Urethane Film) |
| # # # # # # # # | (Inflatable Tube Force Generator) |
| × × × × × × × × × × | (Nitrile Phenolic Film Adhesive) |
| ••••••••••••••••••••• ••••••••••••••••••••• ••••••••••••••••••••• } | (Aluminum Substructure) |

Rain Erosion Results - 1 Hour 30 Minutes.

It was noted prior to testing that sample 5 included a small crack at its left lower side. As rain erosion testing time accumulated, this initial defect propagated as a fracture in the titanium skin followed by chunking around the crack. The part was deemed unserviceable after 1 hour 30 minutes testing. Total failure was deemed to have occurred at about 2 hours 30 minutes.

EXAMPLE 6

Sample 6 was of the following construction:

| | |
|---|---|
| — — — — — — — — — — | (.005 Thick Ti alloy) Surface |
| + + + + + + + + + + | (Nitrile Phenolic Primer) |
| × × × × × × × × × × | (Nitrile Phenolic Film Adhesive) |
| # # # # # # # # | (Inflatable Tube Force Generator) |
| × × × × × × × × × × | (Nitrile Phenolic Film Adhesive) |
| ••••••••••••••••••••• ••••••••••••••••••••• ••••••••••••••••••••• } | (Composite Substructure) |

Rain Erosion Results - 7 Hours Without failure.

Figure 4:
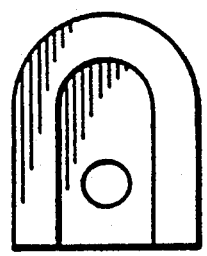
FIGS. 4, 5 and 6 respectively are a side elevation view, front elevation view partially broken away, and a bottom view of a rain erosion test sample holder.
Figure 5:
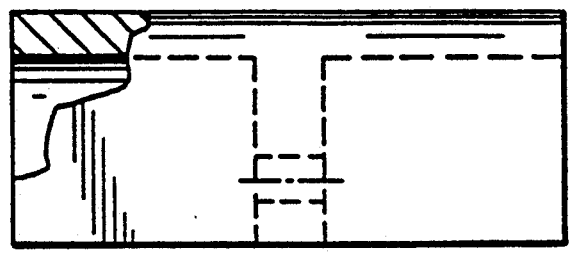
Figure 6:
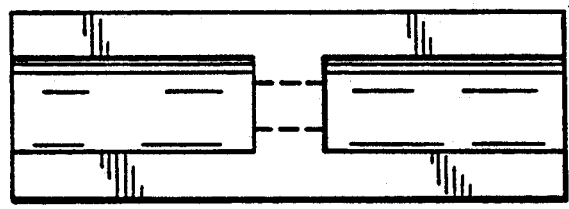

In each of the examples 1 through 6, the commercially available adhesive materials were utilized in accordance with the manufacturer's directions. The titanium alloy surface ply was 0.005 inch thick Ti-15V-3Al-3Cr-3Sn per AMS 4914, anodized with chromic acid on the surface to be adhesively bonded. The aluminum substructure or backing was made of 6061 T6 alloy configured as shown in FIGS. 4 through 6. The aluminum substructure had an overall length of three inches, a leading edge radius of 0.50 inch, a wall thickness of 0.25 inch, and an overall height of 1.25 inches. The nitrile phenolic film adhesive (3M Company AF32, 10 mils. thickness) was used with its complementary nitrile phenolic primer in accordance with the manufacturer's directions. No primer was applied to the composite substructure prior to application of the nitrile phenolic film adhesive.

Manufacture of sample 6 included two major steps. In the first step, the titanium alloy skin was bonded to the outer ply of nitrile phenolic film adhesive, active force generation zone and inner ply of nitrile phenolic film adhesive by partially curing in a hot air autoclave about 1 hour at about 350° F. and about 3 atmospheres pressure. In the second step, a graphite epoxy prepreg composite substructure was bonded to the structure formed in step 1 by laminating layers of the graphite epoxy prepreg to the inner layer of nitrile phenolic adhesive and placing the assembly in a hot air autoclave for 1 hour at 350° F. and about 3 atmospheres pressure. Rain erosion testing of the resulting Sample 6 for seven hours resulted in observation of slight erosion at both side edges of the sample, with no damage or erosion being observed elsewhere.

For example 6, the rain erosion test specimen was prepared to have the same overall dimensions and leading edge radius as the specimens of examples 1 through 5. The fiber-reinforced composite substructure had a nominal thickness of 0.100 inch. A plurality of countersunk holes were provided along each trailing edge of the specimen. The specimen was secured to an adapter affixed to the rotatable blade of the rain erosion test apparatus by a plurality of countersunk machine screws. The adapter was affixed to the blade in the manner used in regard to specimens of examples 1 through 5.

RAIN EROSION TEST PROCEDURE ONE

Rain erosion testing of samples 1 through 6 was conducted in the following manner. Test specimens were mechanically affixed to a rotatable arm of the test apparatus. The apparatus was adjusted to provide a sample speed of 500 mph which corresponded to an arm rpm of 1400. Water flow rate was set at 0.8 gallons per minute resulting in a rainfall rate of 1 inch per hour with a water droplet diameter of from about 1.5 to 2.0 millimeters. Each of samples 1–6 was tested utilizing the same apparatus and above stated conditions.

To confirm the excellent rain erosion resistance exhibited by Sample 6, additional samples were prepared having the following constructions.

| Sample 7 | |
|---|---|
| — — — — — — — — | (.005 Thick Ti alloy) Surface |
| + + + + + + + + | (Nitrile Phenolic Primer) |
| × × × × × × × × | (Nitrile Phenolic Film Adhesive) |
| # # # # # | (Inflatable Tube Force Generator) |
| × × × × × × × × | (Nitrile Phenolic Film Adhesive) |
| •••••••••••••••• •••••••••••••••• •••••••••••••••• } | (Graphite Epoxy Composite Substructure) |

Rain Erosion Results - 4 Hours 30 Minutes without failure.

| Sample 8 | |
|---|---|
| — — — — — — — — | (.005 Thick Nitrited Ti alloy) Surface |
| + + + + + + + + | (Nitrile Phenolic Primer) |
| × × × × × × × × | (Nitrile Phenolic Film Adhesive) |
| # # # # # | (Inflatable Tube Force Generator) |
| × × × × × × × × | (Nitrile Phenolic Film Adhesive) |
| •••••••••••••••• •••••••••••••••• •••••••••••••••• } | (Graphite Epoxy Composite Substructure) |

Rain Erosion Results - 4 Hours 30 Minutes without failure.

RAIN EROSION TEST PROCEDURE TWO

Figure 7:
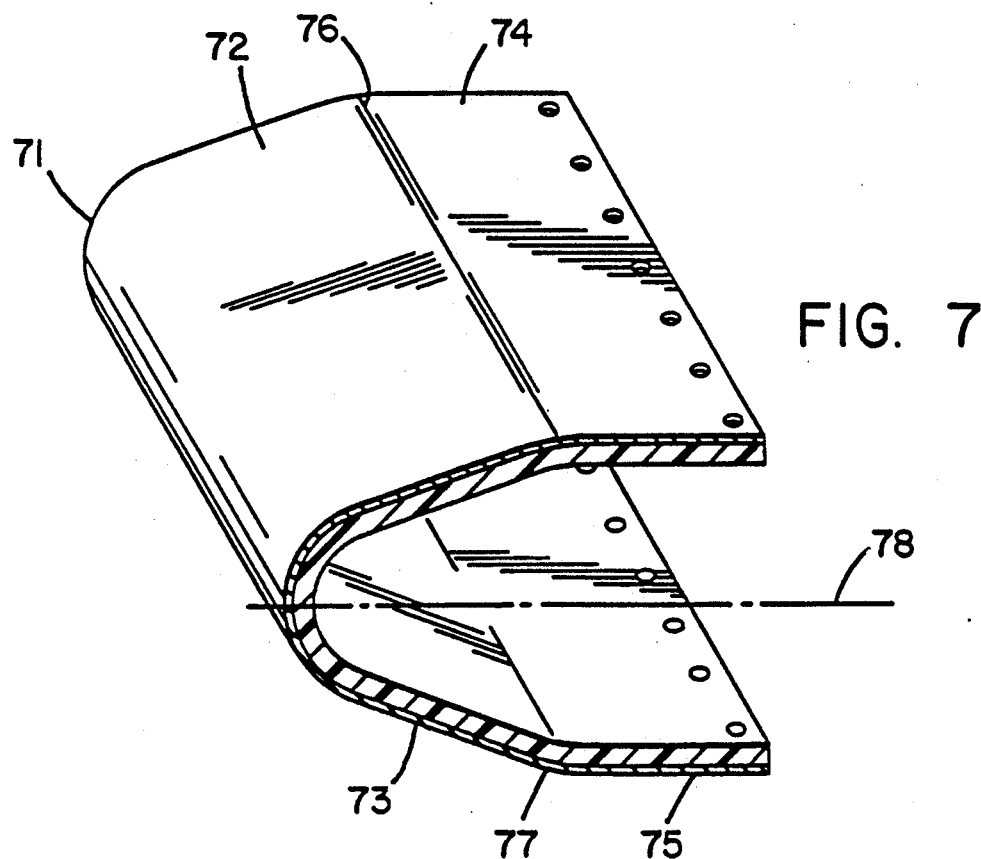
FIG. 7 is an isometric view of another test sample configuration used in testing rain erosion resistance.

Samples 7 and 8 having the shape depicted in FIG. 7 were subjected to rain erosion testing at a major airframe manufacturer. Dimensions of the samples were as follows: overall length of at least four inches, a leading edge radius 71 of 0.50 inch and an arc of 170 degrees, upper and lower leading flat areas 72, 73 extending 1.40 inches rearward from the leading edge arc at a 20 degree angle relative to the chord 78 of the specimen, and trailing upper and lower flat areas 74, 75 extending about 1.4 inches rearward from the respective forward flat areas 72, 74 parallel to the chord 78 of the specimen. The junctions 76, 77 of the respective associated leading and trailing flat areas had a radius of 0.06 to 0.25 inch. Test conditions included a speed of 600 mph at the midpoint of specimen and a water spray delivery rate of three to four inches per hour with a water droplet size of 1.5 to 2.0 millimeters. Minimum performance specifications of the aircraft manufacturer include a requirement that after 4 and ½ hours of rain erosion testing under the above stated conditions, the surface finish remain smoother in feel to a human hand than 240 grit sandpaper. Samples 7 and 8 exceeded the performance of conventional aluminum alloy aircraft outer skins on this test.

MANUFACTURE

Unless otherwise indicated at the point of use, all pressures are understood to be gauge pressure.

The structural member having integral surface separation capability according to the present invention may be manufactured as follows. A building form corresponding to the contour of the airfoil to be fitted with the leading edge apparatus is prepared. Most preferably, this is a female form which enables the leading edge apparatus to be built beginning with its outside high modulus skin layer and progressing inwardly to its base layer which will be joined to the airfoil. The manner of joinder of the completed apparatus to the airfoil is typically by use of mechanical fasteners such as recessed or flush head screws or rivets.

Manufacture of an embodiment similar to that shown in FIGS. 1, 2 and 3 and having the construction details of Sample 7 is as follows. A sheet of titanium alloy is anodized on one side which is thereafter primed by spraying with a fine mist of nitrile phenolic primer, 3M Company product code EC3901 per manufacturer's directions. The primed titanium alloy layer is thereafter baked according to the adhesive manufacturer's recommendations, in this example, 30 minutes at about 180° F.

Inflatable tubular members of the desired dimensions for the intended application are assembled from polymer coated fabric. For the preferred embodiment described in Example 7, tightly woven square weave pattern of nylon fabric having a thickness of about 0.007 inch and coated on one side to an overall thickness of about 0.015 inch with 3M Company AF32 nitrile phenolic was utilized. The coated fabric is cut on a bias into strips of the required length and width for each tube such that the cords run at a bias angle of about 45 degrees relative to the length of the strip. A typical flattened tube has a width of from about one to about two and one half inches, the smaller tube width being employed where the tube is to extend along a small radius region such as straddling a leading edge. A layer of PTFE tape or other suitable non-adhering material of a width corresponding to the width of the tube to be formed is positioned over its respective strip of tube fabric. Each tube is formed by wrapping a strip of such coated fabric in its lengthwise direction around a layer of non-adhering material so as to form a lengthwise extending overlapped area. Preferably, an additional layer of PTFE hereinafter referred to as a billet, of like width and length dimension and greater thickness than the tape is superposed on the tape. This billet facilitates forming the coated fabric into a tube. Preferably, the coated side of the fabric is positioned to form the interior of the tube. The PTFE film prevents curing together of the adjacent layers of nitrile phenolic coated fabric during subsequent manufacturing steps. This PTFE tape or other suitable release film or treatment can be allowed to remain in the completed structure. When a release tape is employed and is not to be later removed, it should be adherent on one side to the tube. The individual tubes are placed into the female mold form in the position they respectively will be located in the resulting structural member, and cured in an autoclave. The PTFE billet is removed after this tube formation step.

After this curing of the individual tubes, an aperture is formed in each tube and a fitting installed. Additional film adhesive and fabric reinforcement is used to bond the fittings to their respective tubes. In certain preferred embodiments an inlet fitting and an outlet fitting are installed near opposite ends of the tube. The internal passage of the inlet fitting is round at its end nearest the impulse delivery valve and defines an elongated slot with rounded ends where it joins the inflatable tubular member. The outlet fitting has a round internal passage. After installation of the fittings, the ends of the tubes are closed, e.g., by being folded over with additional film adhesive. The combined tubes and fittings are overlaid with a backing layer of the same coated fabric from which the tubes are formed. This subassembly is placed into the female mold form in the position it will occupy in the resulting structural member, vacuum bagged and further cured in an autoclave to bond these parts together. Use of the female mold form assures that the subassembly assumes a curvature matching that of the form. The subassembly is removed from the mold after curing.

The female mold is provided with a layer of mold release and/or release fabric or otherwise treated to assist in release of the heat cured subassembly from the female mold.

The titanium alloy outer skin is fitted into the female mold form. An outer bonding layer of nitrile phenolic film adhesive 3M code AF32 is applied to the primed and baked surface and rolled down manually while heating with a hot air gun. The outer bonding layer of film adhesive is preferably and most easily applied on a flat surface such as a work table prior to insertion of both into the mold. A layer of reinforcing fabric may be applied to the inner surface of the outer skin after application of the film adhesive. The film adhesive may be fiber reinforced.

The previously cured subassembly of combined tubes, fittings and fabric backing is applied to the outer bonding layer in the mold. At this point the combined outer skin, outer bonding layer and subassembly are adhesively joined by curing in a hot air autoclave for 1 hour at 350° F. and 3 atmospheres pressure.

After such joinder of the outer skin and subassembly, the layers forming the composite substructure are applied to the part being manufactured while the assembly remains in the female mold. In a preferred manner of substructure manufacture a plurality of layers of epoxy resin prepreg reinforcing fabric (for example, Ciba Geigy code R6376/CGG108, a graphite fiber epoxy prepreg) are successively applied until completion of the desired substructure. After completion of substructure prepreg layup, the assembly is again placed in the autoclave for completion of cure. For the nitrile phenolic and epoxy systems employed in the construction of Sample 7, this final cure was hour at 350° F. and 3 atmospheres pressure dry air. Each of the previously described cure steps were performed using similar conditions. Thereafter the part and mold are removed from the autoclave and the part removed from the mold.

To facilitate flush mounting by mechanical fasteners, the titanium skin is dimpled and bored through at locations appropriate to the intended airfoil application prior to lay-up of the composite part. Following completion of all mold curing steps, the part is bored through at these dimpled locations.

The completed part is thereafter installed for use with rivets or screws such as those depicted in FIG. 1 to its intended structural member. The inlet ports in each of the tubes for introduction of gas pressure impulses into the inflatable members provided during construction of the part are coupled to a conduit which in turn is in fluid communication with fluid impulse generation apparatus.

Alternatively, when the radius of curvature is sufficiently large such that buckling or puckering of the tubes does not occur upon attempt to enter the following described flat preform into the mold, for convenience, the uncured tubes and fittings may be applied to the combined outer skin and outer film adhesive layer on a flat work surface to form a preform. If the radius of the female mold is sufficiently small, buckling or puckering may occur upon attempt to enter the flat preform into the mold. Where such buckling or wrinkling of the tubes or backing fabric is observed, the tubes are preferably applied after insertion of the preform into the female mold.

ALTERNATIVE EMBODIMENT FOR A FORCE AND DISPLACEMENT MEANS

With reference to FIG. 10, an alternative embodiment of a structural member having an integral de-icer is illustrated. In particular, this embodiment incorporates a different arrangement of the inflatable tubes, which arrangement results in improved de-icing performance in different types of leading edge designs, such as, for example, leading edges having ice accreting surfaces susceptible to fatigue. Another advantage of this alternative embodiment of the force and displacement means is that it can be easily adapted for use with a conventional de-icer of the type described hereinbefore that is attached to a pre-existing airfoil or leading edge.

In FIG. 10, like parts are given like numerals with respect to various elements illustrated in FIGS. 1-9. It should be noted, however, that certain relative dimensions of elements shown in FIGS. 10-12 have been exaggerated for the sake of explanation. The structural member 10 may be attached or secured to the remainder of the airfoil structure 200 in a conventional manner such as flush fitting fasteners 50.

Figure 11:
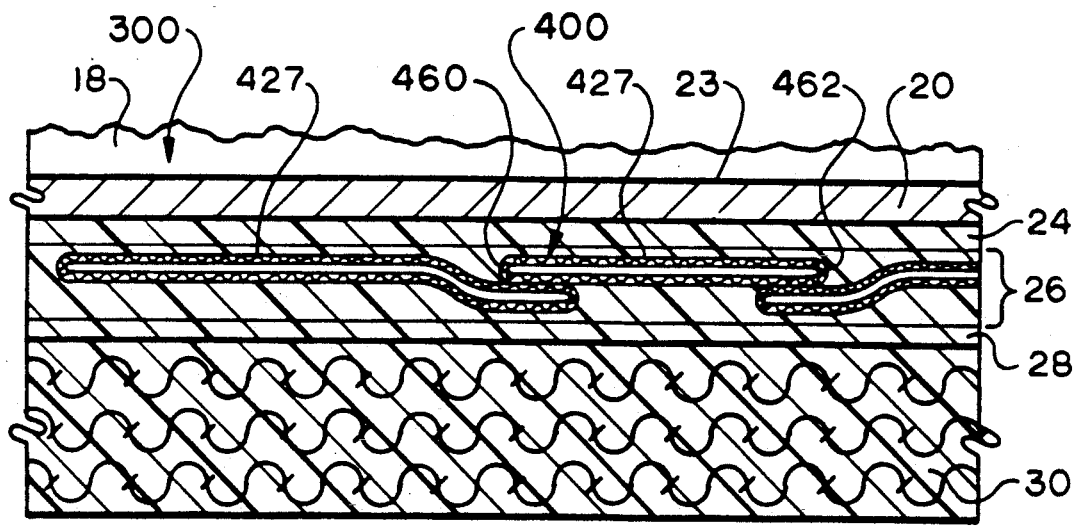
FIG. 11 is a view similar to FIG. 2 but for the apparatus shown in FIG. 10.

Referring next to FIG. 11, an improved de-icer 300 includes the same basic elements as the de-icer illustrated in FIGS. 1-3. Thus, there is a surface ply or outer skin 22 that preferably has a high modulus of elasticity. Subjacent the outer skin 22 is an outer or skin bonding ply 24 of polymeric material. Immediately subjacent and underlying the bonding ply 24 is an improved expulsive force and displacement means 26, which preferably is in the form of a multi-tube mat 400. Immediately subjacent and underlying the force and displacement means is an inner bonding ply 28 of polymeric material. Subjacent and underlying the inner bonding ply 28 is a fiber reinforced composite substructure 30. A layer of ice 18 is shown adhered to the outer ice accreting surface 23 of the outer skin 22.

The outer skin 22 is preferably of a high modulus metallic material such as titanium alloy or plastic material such as polyetheretherketone. However, those skilled in the art will understand that when the displacement means 26 is alternatively used in a conventional de-icer boot or assembly, the outer skin 22 and ice accreting surface may be made of an elastomeric material that is substantially more flexible and elastic than the preferred outer skin materials.

The materials and manufacturing methods for forming the de-icer 300 may be identical to the previously described de-icing apparatus 20 except as noted hereafter. The most apparent difference is that the de-icer apparatus 300 includes a multi-tube mat 400 that preferably is prepared as a separate assembly prior to installation in the composite structural member 10.

The tube mat 400 includes a plurality of inflatable tube elements 427 that preferably are formed in the same manner with the same materials as the tubes 27 in the embodiment of FIGS. 1-3. However, after the separate tubes are formed with a predetermined length and width appropriate for the particular airfoil design, and prior to curing the tubes 427, the tubes are laid out lengthwise starting with the center or leading edge active tube 427a. Next, the chord-wise laterally adjacent tubes 427b are overlapped widthwise along opposite edges 460,462 of the center tube 427a. Thus in this preferred embodiment, the tubes 427 are arranged generally in a configuration in which the tubes extend longitudinally in a spanwise direction along the airfoil leading edge and are placed and overlapped side by side in a chordwise direction. Other orientations of the mat are, of course, possible. As shown in FIG. 10, additional lateral tubes 427c may be used depending on the degree of ice removal coverage desired for the leading edge 10.

Figure 10A:
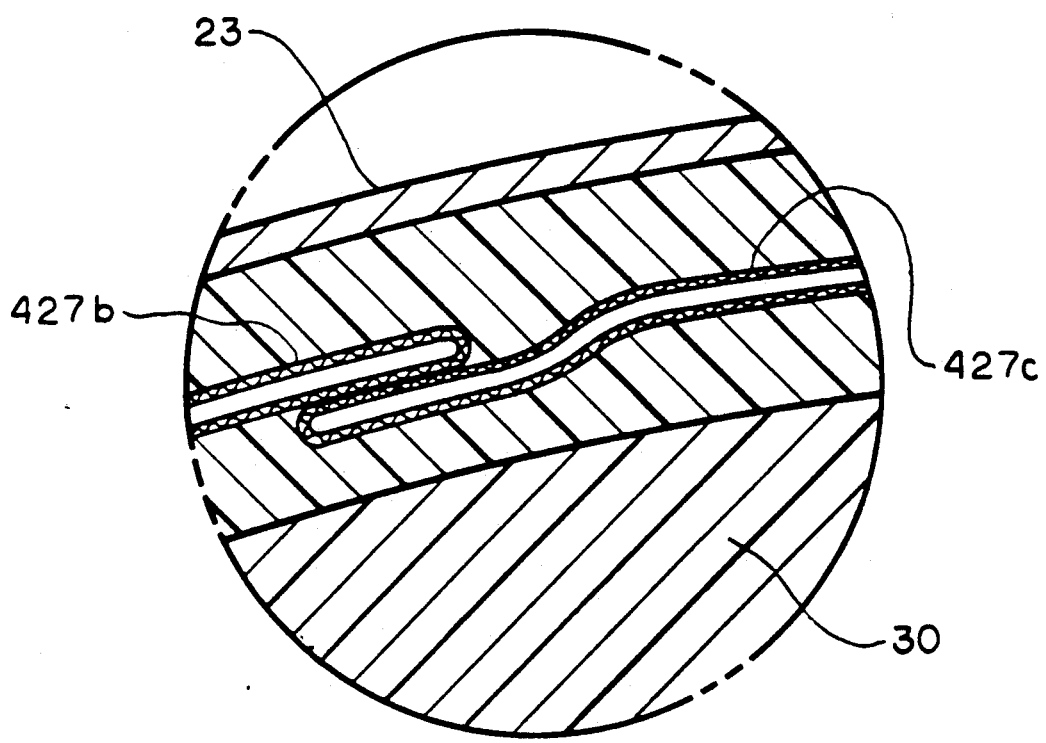
FIG. 10A is an enlarged view of an overlap tube feature according to the present invention, the overlap area being circled in FIG. 10.

As shown in FIG. 10A, each of the inflatable tubes 427 is overlapped widthwise with each tube that is adjacent thereto across the entire span of the tubes. In addition to being overlapped, the laterally adjacent tubes are preferably bonded together in the area of the overlap with the use of a suitable adhesive such as a phenolic cement. A suitable adhesive is the film adhesive AF32 available from 3M Company. Although the tubes 427 are bonded together in the overlap regions, preferably the tubes are not in fluid communication with each other. That is, each tube is separately inflatable as described previously herein, and inflation of one tube preferably does not result in the passage of fluid into an adjacent attached tube. The use of the cement to temporarily hold the mat together prior to cure is preferred for convenience, but not absolutely required. For example, the individual tubes are preferably formed with an adhesive layer applied on the inside of the tubes. This adhesive can preferably be used to provide the bonding layers 24, 25 as previously described herein, as well as the adhesive to bond the overlap regions.

The amount of bonded overlap between laterally adjacent tubes may vary depending on the particular application of the de-icer assembly, however, a quarter inch overlap is preferred with tubes having approximately two inch widths. Such an overlap is adequate to maintain the structural integrity of the mat when the individual tubes 427 are inflated while at the same time permitting an adequate distribution of the active expulsive forces. It is expected that for most applications, the amount of each overlap preferably will not exceed twenty-five percent of the width of each overlapped tube.

As described, the mat 400 is preferably built as a separate assembly. The fittings are then installed as previously described with respect to the de-icer 20. The mat can then be installed in the female mold form in the position it will occupy in the resulting structural member, vacuum bagged and further cured in an autoclave to bond the parts together. The cured mat is then removed from the mold and the structural member 10 can be completed in substantially the same manner as previously described herein. Although preferably the mat is built as a separate assembly outside the mold, it is also possible to build the mat using the overlap configuration during individual placement of the tubes 427 in the female mold prior to cure. However, it is expected that in most situations, this approach will not be as efficient and useful as preparing the tube mat separately prior to installing it in the mold.

Figure 12:
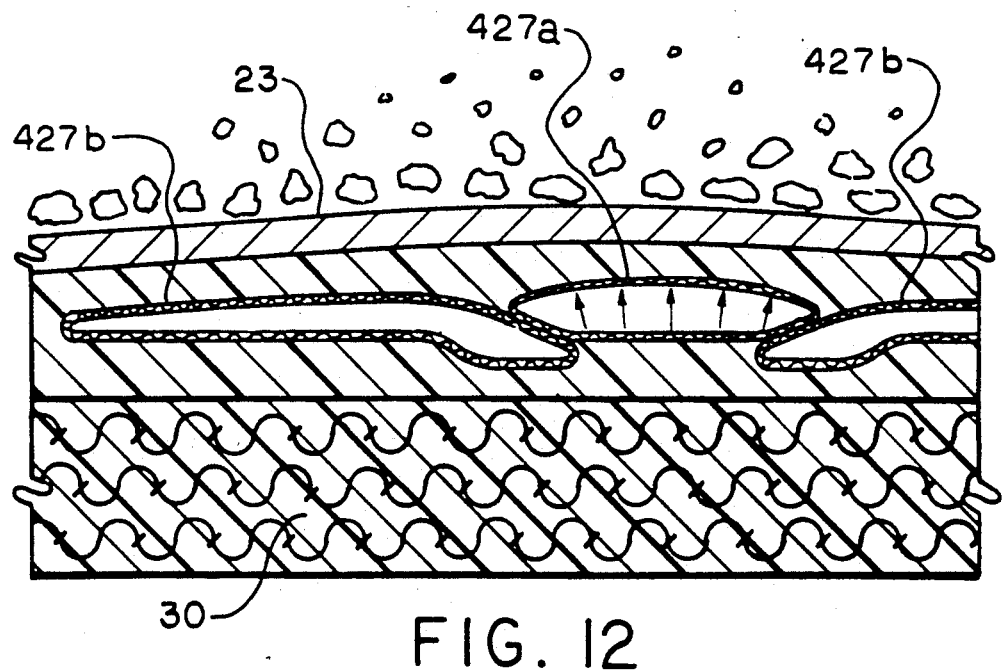
FIG. 12 is a view similar to FIG. 3 but for the apparatus shown in FIG. 10.

FIG. 12 is similar to FIG. 3 and shows the improved tube mat construction in an expanded state. However, the movement of the surface 23 and tubes has been exaggerated in FIG. 12 to illustrate the improved distribution of the displacement forces (resulting in lower bending moments and less fatigue) as well as increased shear stress being applied across the leading edge surface (due to all the tubes being at least partially actuated when one tube is inflated) caused by displacement of adjacent tubes when one tube is inflated. In FIG. 12, the center tube 427a has been expanded by the application of a high fluid pressure impulse. Although the adjacent tubes 427b are not inflated with pressurized fluid, the adjacent tube surfaces bonded to the center tube 427a are subjected to a displacement force caused by displacement of the center tube 427a. This displacement force is greatest near the bonded areas and decreases laterally in a chord-wise direction therefrom. Thus, inflating one tube causes an actuation or displacement of each bonded adjacent tube, which effect results in a distributed shear force being applied to the ice accreting surface 23. In fact, all of the attached tubes will be at least partially actuated. This increased shear force from the mutual actuation of the tubes occurs regardless of which tube or tubes are being pneumatically actuated during a de-icing cycle. Therefore, the strain and displacement forces applied to the surface 23 are distributed over a greater area when each tube is individually inflated resulting in a decrease in bending moments and stress points in the outer skin at the regions near the tube overlaps. However, at the same time, because each tube is partially actuated and exerts a shear displacement force to the surface 23, the chord-wise strain applied to the ice accreting surface 23 apparently increases such that, quite unexpectedly, the ice removing capability of the de-icer is improved over a greater area of the leading edge. This is represented in FIG. 10 with the shear force lines B. It will be noted that when the center tube 427a is inflated, the tight radius active surface experiences the highest amount of displacement force normal to the surface 23, but the remaining surface of the leading edge also experiences significant shear forces B to help dislodge ice over a greater percentage of the ice accreting surface.

Figure 9:
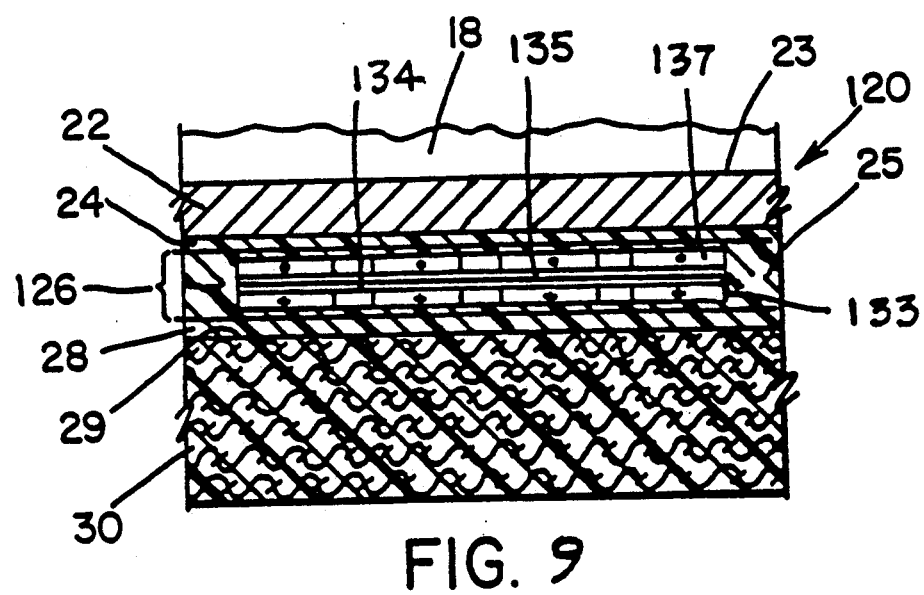
FIG. 9 is an enlarged fragmentary sectional view of an apparatus similar to that shown in FIG. 2 except that the force and displacement generation means comprises electromagnetic apparatus.

While the invention and the various embodiments thereof have been described in detail to include pneumatic impulse force and displacement generation means, it is believed possible to substitute any other thin planar force and displacement generation means into the active zone which lies between the spaced layers of film adhesive. Examples of suitable thin, sheet-like electromagnetic force and displacement generation means are described in U.S. Pat. No. 4,690,353 to Haslim et. al. and U.S. Pat. No. 4,875,644 to Lowell J. Adams, et. al. In FIG. 9 there is shown de-icing apparatus 120 according to an alternative embodiment of the present invention. Apparatus 120 is of a construction similar to that described in reference to FIG. 2 except that the force and displacement generation means underlying the surface or outer skin 22 or skin bonding ply 24 is thin sheet-like electromagnetic force and displacement generation means 126, as taught by Adams et al. The electromagnetic force and displacement generation means of Adams et. al. includes a pair of sheet-like arrays, each containing in spaced apart relationship a plurality of parallel ribbon-shaped electrically conductive members. The electrically conductive members are electrically interconnected such that any current flowing in the conductive members flows in the electrically conductive members of the second sheet-like array in a direction opposite. Preferably, the electrically conductive members are interconnected such that any electrical current flowing in the conductive members flows in the same direction in adjacent electrically conductive members in the first sheet-like member and also flows in adjacent electrically conductive members of the second sheet-like array in an opposite direction. The first and second sheet-like arrays are coextensive and superposed proximate to each other such that the electrically conductive members of the first and second sheet-like members are substantially parallel. The electrically conductive members are electrically insulated from one another. Large magnitude current pulses are fed to the conductors from a power supply resulting in rapid and forceful separation of the first and second sheet-like arrays, thereby causing rapid movement of the outer high modulus layer on which ice may accrete.

Although the invention has been described with reference to certain and preferred embodiments, including the best embodiments, it would be apparent to people skilled in the art of de-icing of aircraft that other variations are possible which are obvious thereover. These variations are intended to be included by the present specification and appended claims. Different adhesive materials may be employed. The individual inflatable tubes or the tube mat in the alternative embodiment may be bonded directly to the outer skin and the substructure without use of separately applied adhesive film bonding layers. The outer metallic skin may be treated to further enhance its hardness or to provide a reduced coefficient of ice adhesion. The outer metallic skin may be provided with a backing layer of fiber reinforced resin to enhance resistance to impact, e.g., hail or bird strikes. A combination of gas pressure impulse and electrically energized force and displacement generating means may be employed in a single part. The composite substructure need not be of uniform thickness or construction throughout the entire contour surface but rather may be locally made of differing dimensions and properties according to the requirements of the intended application. Specifically, the composite substructure may be reinforced adjacent to its point of mechanical joinder to remainder of the airfoil structure. Hydraulic as well as pneumatic fluid pressure may be used for actuating the inflatable members 27 and 427. The individual inflatable tubular members and/or the tube mat may be arranged to extend in a spanwise direction of airfoil as depicted in FIGS. 1 and 11 or in the chordwise direction (not illustrated) or in a combination of directions to provide enhanced performance. The best manner of tube arrangement for a particular application is empirically determinable by one skilled in the art.

What is claimed is:

1. An improved de-icer of the type that is attached to the surface of a support structure that together form a leading edge with integral de-icing capability, said leading edge having upper and lower surfaces, comprising:
    (a) an ice accreting surface,
    (b) at least two inflatable tubes extending in a lengthwise direction, each tube being completely encircled by textile material in a widthwise direction and coated on at least one surface with polymeric material and (c) means for separately inflating each tube, at least one tube overlying a substantial portion of said upper surface of said support structure and at least one tube overlying a substantial portion of said lower surface, each tube being subjacent said ice accreting surface in adjacent lengthwise coextending relationship, each tube partially overlapping each adjacent tube along a widthwise portion of each tube, said overlapping area extending in said lengthwise direction along each tube, said overlapping area increasing transfer of chordwise strain in the ice accreting surface from an area overlying a tube inflated by pressurized fluid to an area overlying a tube not inflated by pressurized fluid.

2. The improved de-icer according to claim 1 wherein said first and second tubes overlap not more than 25 percent of their respective widths.

3. The improved de-icer according to claim 1 wherein said first and second tubes are adhesively bonded together at said overlap portions so that inflation of one tube causes a strain inducing displacement of the other tube to increase shear forces in said ice accreting surface.

4. The improved de-icer according to claim 1 wherein said ice accreting surface is part of a thin high tensile modulus outer skin and said support structure is a nonmetallic high tensile modulus fiber reinforced matrix.

5. The improved de-icer according to claim 4 wherein said displacement tubes are adhesively bonded to said overlying outer skin and said underlying support structure by respective layers of nitrile phenolic or epoxy, such that said outer skin, displacement tubes and support structure form a leading edge structure having integral surface de-icing capability.

6. The improved de-icer according to claim 1 comprising a center displacement tube and a plurality of laterally adjacent tubes on each side of said center tube with each tube extending lengthwise along said ice accreting surface, each of said tubes being joined to at least one laterally adjacent tube such that adjacent tubes partially overlap in a widthwise direction, all of said tubes being formed as an integral mat that is structurally bonded to said overlying ice accreting surface and said underlying support structure.

7. The improved de-icer according to claim 6 wherein said ice accreting surface, displacement elements and said underlying support structure form an integral de-icer assembly that can be bonded to an airfoil leading edge.

8. The improved de-icer according to claim 7 wherein each of said displacement tubes is formed from at least one ply of fabric coated on at least one surface with polymeric material cured to form the tube.

9. The de-icer of claim 1 further comprising at least a third tube overlying the support structure, said ice accreting surface overlying said third tube being subjected to increased chordwise strain upon inflation of a non-adjacent tube.

10. The de-icer of claim 1 further comprising at least a third tube, said third tube substantially overlying a marginal area of said support structure between said upper and lower surfaces, said ice accreting surface overlying each tube disposed on said supper and lower surfaces being subjected to increased chordwise strain upon inflation of said third tube.

11. A structural member having integral surface de-icing capability comprising:
a) a non-metallic high tensile modulus fiber reinforced matrix structural composite substructure;
b) a high tensile modulus outer skin; and
c) thin force and displacement generation means including a plurality of inflatable tubular elements extending lengthwise along said outer skin;
said force and displacement means being subjacent and bonded to said outer skin, and further overlying and bonded to said substructure; said plurality of inflatable tubular elements having at least two laterally adjacent tubular elements that are overlapped and bonded widthwise along respective edge portions whereby inflation of one tube causes a strain inducing displacement of said adjacent tube.

12. The structural member of claim 11 wherein said tubular elements are connectable to a fluid impulse inflation means with each tubular element being inflatable independently of adjacent bonded tubular elements.

13. The structural member of claim 11 wherein inflation of one of said tubular elements causes movement of said outer skin and causes movement of adjacent tubular elements to increase chordwise strain in said outer skin and distribute fatigue stresses over a greater surface area of said outer skin.

14. The structural member of claim 13 wherein laterally adjacent tubular elements are adhesively bonded together along said edge portions which are less than or equal to 25% of a tubular element's width.

15. The structural member of claim 11 in combination with an airfoil, said structural member being secured to said airfoil to form the leading edge thereof.

16. A method of making a tubular fluid displacement de-icer for a leading edge, the method comprising:
a) forming an ice accreting outer skin;
b) forming a multitube force and displacement mat by laying adjacent inflatable displacement tubes lengthwise parallel, and joining said tubes widthwise in an overlapping manner;
c) forming a support substructure;
d) curing and bonding the combined outer skin, force and displacement mat and substructure at elevated temperature and pressure to provide said de-icer.

17. The method of claim 16 wherein the step of forming said force and displacement mat includes the steps of forming individually inflatable tubular members of polymer coated fabric, adhesively bonding a plurality of said tubular members to form said mat prior to curing said tubular members, and curing said displacement mat in the configuration it will assume in the completed de-icer prior to bonding it to said outer skin and support substructure.

18. The method of claim 17 wherein said outer skin is formed of a high tensile modulus material and said substructure is a composite structure formed of a plurality of layers of reinforcing filaments in a polymeric matrix.

19. The method of claim 16 wherein said de-icer is integrally formed in a leading edge structural member.

20. The method of claim 16 wherein said de-icer is attachable to a leading edge structural member.

21. The method of claim 16 further including the steps of applying an inner bonding layer to said force and displacement mat and applying an outer bonding layer to said outer skin, said bonding layers being applied prior to said step of curing and bonding the combined elements.

* * * * *